Figure 1:
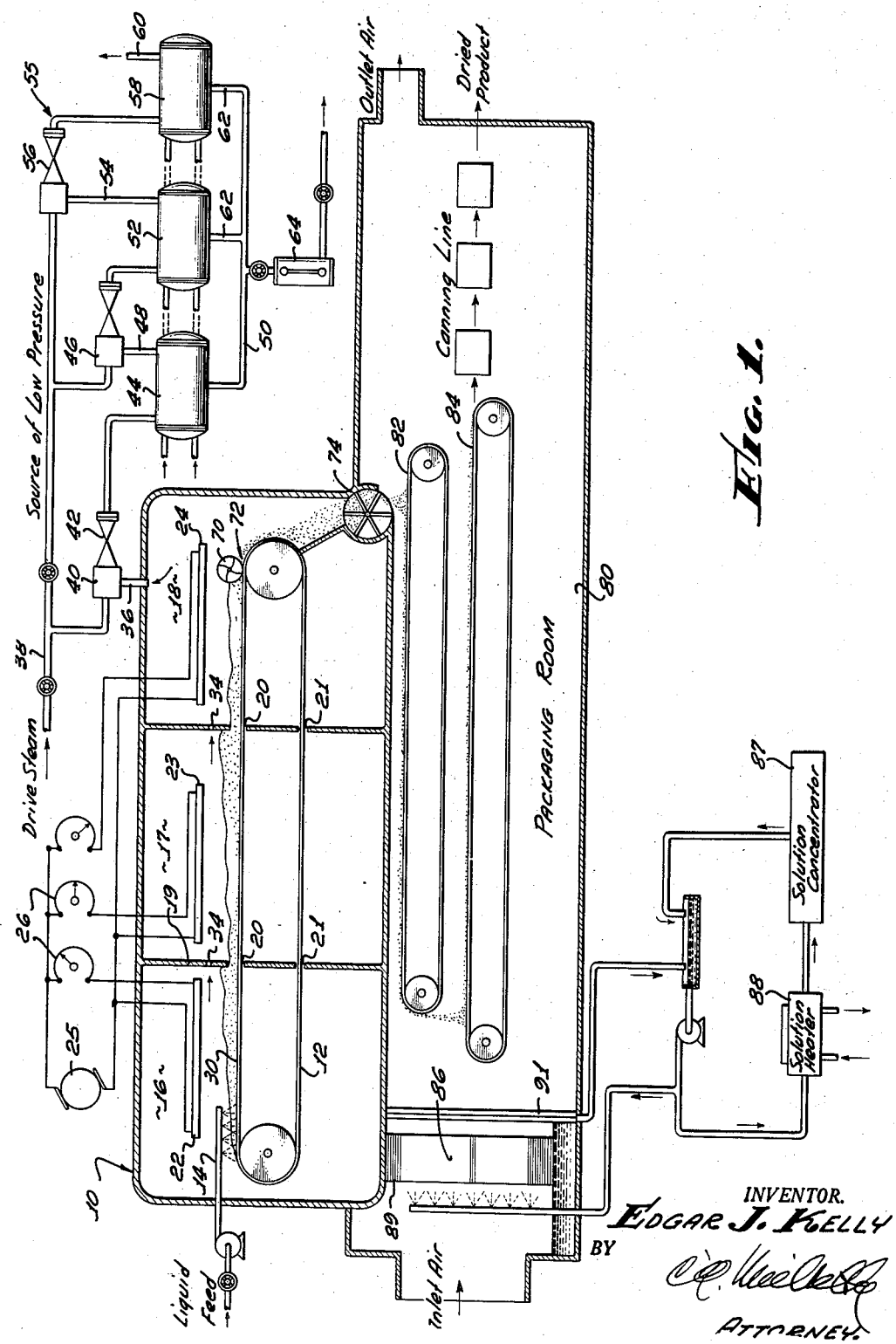

Aug. 5, 1958

E. J. KELLY 2,846,319

DRYING PROCESS

Filed July 26, 1955

2 Sheets-Sheet 1

INVENTOR.
EDGAR J. KELLY
BY
ATTORNEY.

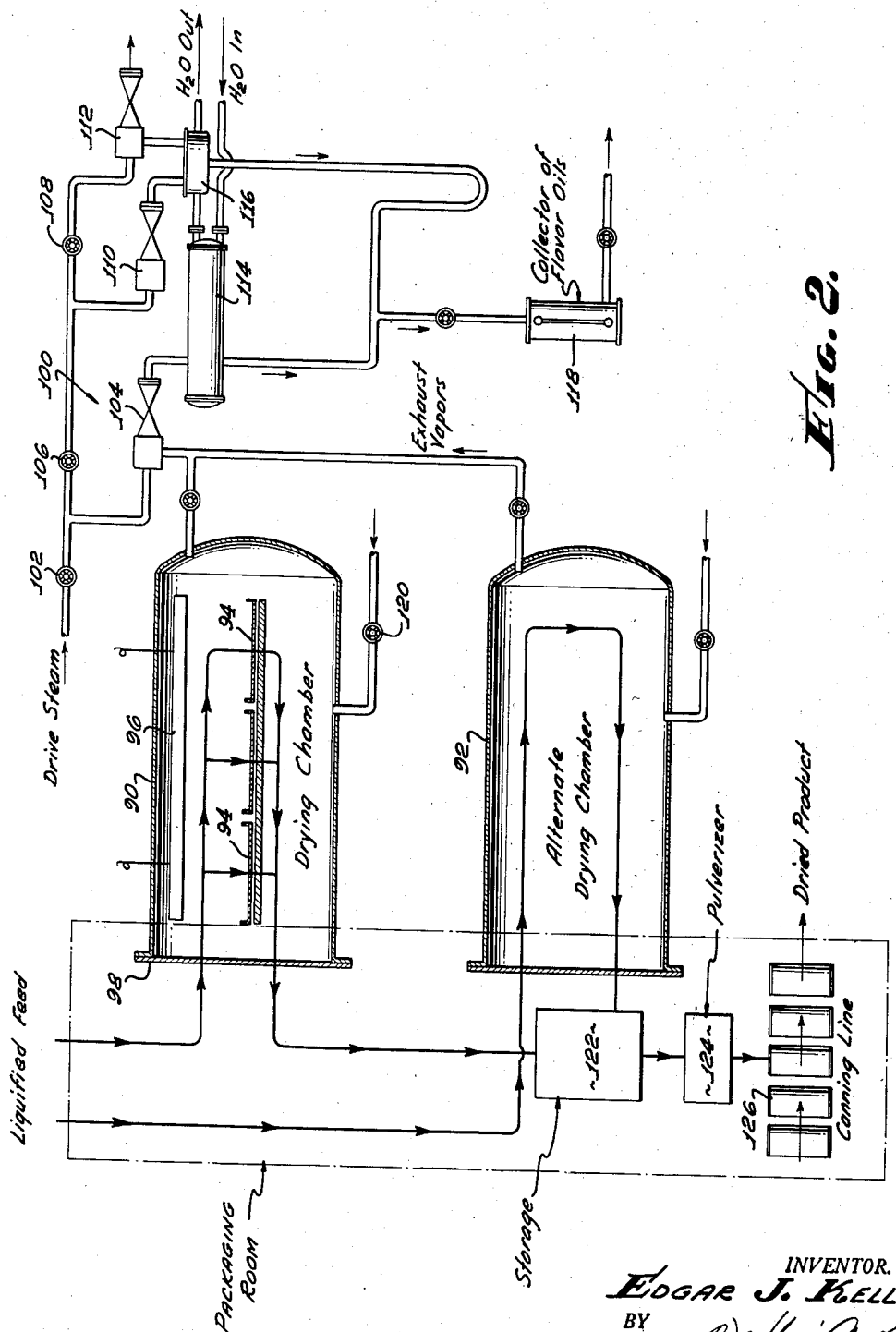

United States Patent Office 2,846,319
Patented Aug. 5, 1958

2,846,319
DRYING PROCESS

Edgar J. Kelly, Placentia, Calif., assignor to E. J. Kelly & Associates, Inc., Los Angeles, Calif., a corporation of California Application July 26, 1955, Serial No. 524,400

11 Claims. (Cl. 99—205)

This invention relates to the production of free-flowing, dry, readily wettable food products, and more particularly, to a method and means for drying liquefied fruit and vegetable source materials to substantial dryness without development of off flavors.

Considerable emphasis has been recently placed on the production of dried, readily wettable food and beverage products for use both in domestic markets and for shipment overseas to military and other personnel. Familiar examples are the drying of fruit and vegetable juices such as grape, orange, tomato, and other juices and the drying of soups, potatoes, and other foodstuffs to powdered or crystalline forms suitable for reconstitution by the addition of measured amounts of water. Although commercial drying techniques for such purposes are many and varied, none have been entirely satisfactory in providing products of sufficient dryness without impairment of the fresh flavor of the reconstituted product.

In spray drying, for example, the liquids are dried by spraying droplets of the liquid into currents of heated air or gas, which usually range in temperature from about 200° F. to 1200° F. However, for satisfactory operation the liquid must be so finely divided that much of the resultant dry material stays in suspension in the stream of a gas. Consequently, at normal operating temperatures a principal difficulty is to so direct the gas stream that the particles do not touch the walls of the drier until they are completely dry, otherwise a large part of the product adheres to the walls as a sticky, partly dried coating. On the other hand, if higher operating temperatures are employed, materials particularly sensitive to heat or oxidation may undergo physical or chemical change destructive to delicate flavor or quality. This is particularly true of source materials containing fruit sugars or glucosides which tend to glaze and produce off flavors at temperatures as low as 100° F.

In an attempt to overcome these difficulties and also to obtain readily wettable crystalline products, vacuum dryers are sometimes employed. Such dryers usually consist of vacuum chambers equipped with hollow shelves on which trays or moving belts carrying the material are supported, with steam, hot water or other medium being used to heat the shelves. Temperatures of the heating medium generally range to 200° F. or higher. In such driers, the drying cycle consists (1) of a constant rate period where the temperature of the material is at the boiling point of water at the absolute pressure prevailing in the dryer and (2) a period in which the rate of evaporation falls off and the temperature of the material rises toward the temperature of the heating medium. Consequently, in the second stage of the drying, it is not infrequent for the material to be heated to glazing temperatures well above the critical limits mentioned above. The effect of such glazing is to cause crusting of the material which through an insulating effect produces uneven drying and prevents uniformity of moisture constant in the finished products. Moreover, such shelf driers are primarily effective only for the removal of free or unbound water that is readily evaporated by application of heat. Bound, hygroscopic or chemically combined moisture on the other hand is not so easily removed by direct heating, requiring sufficiently low absolute humidities in the contacting air to maintain drying potentials about the equilibrium moisture content of the material. With shelf driers, however, any change to prevent equilibrium with the atmosphere ambient the material must be accomplished by heating through the material itself, at a considerable loss in efficiency.

In addition, a further defect of nearly all prior art drying techniques is an inability to dry efficiently to moisture contents below about 3% without the additional prolonged use of desiccants or other chemicals. For example, drying periods of 50 hours or more are not uncommon. Moreover, the materials generally must be retained in the packaged product. However, it is known that the presence of such chemicals greatly reduce the salability and commercial appeal of the products.

Accordingly, a principal object of the present invention is to provide an efficient method of drying liquefied fruit and vegetable source materials in which material temperatures capable of causing appreciable glazing, off flavors, or other detrimental change in the materials are avoided.

Another object of the invention is to provide a method of vacuum drying at low material temperatures in which an unusually large surface of contact between the material and the drying or vaporizing medium is made possible.

Another object of the invention is to provide a rapid and efficient method and means for drying liquefied fruit and vegetable materials to moisture contents of 2% and lower, and for packaging the material at such low moisture content.

Other objects and advantages of the invention will be apparent from the following description and from the drawings in which:

Fig. 1 is a diagrammatic representation of certain parts of the equipment, and illustrates schematically a continuous process for drying liquefied materials according to the invention; and Fig. 2 is a schematic view of an intermittent or batch process for drying such materials.

Broadly, the method of the invention includes the following steps:

(1) Liquefying and preferably concentrating food and beverage source materials.

(2) Subjecting a layer of the liquefied source material to radiant emissions within the range of infrared or hertzian radiations and having wave lengths between about 3.5 and 5.5 microns.

(3) Controllably and progressively decreasing emission temperatures from about 2200° F. to about 1200° F. to achieve a corresponding decrease in the energy or radiation transmitted to the layer.

(4) Maintaining a heated atmosphere of reduced pressure ambient the liquid to cause, in conjunction with the radiations, formation and liberation of water vapor from the layer.

(5) Controllably and progressively decreasing the pressure of the atmosphere from about 120 mm. of Hg absolute to below 6 mm. of Hg absolute to cause vapor puffing of the liquid by increase in the specific volume of water vapor formed in the layer, and a corresponding increase in the surface of drying contact between the liquid and the atmosphere.

(6) Continuing the above operations for a period of time sufficient to reduce the moisture content to below 4% (wet basis) but insufficient to heat the material to temperatures capable of causing appreciable glazing or chemical breakdown of the substantially dry material; and (7) Thereafter, exposing the substantially dry material to an atmosphere having a relative humidity at atmospheric pressures of about 2% to 5% for a time sufficient to further reduce the moisture content of the material at least below 2% (wet basis).

By means of the above process, liquefied food and beverage source materials may be rapidly and efficiently reduced to free flowing, dry, readily wettable forms without development of off-flavors, and may be reconstituted at a later date into liquid products retaining a substantially fresh, natural flavor. These novel results are achieved primarily by a unique selectivity and progressive modulation of heat energy radiated to the material and by simultaneously and progressively increasing the area of contact between a drying atmosphere ambient the material and the water to be removed. More specifically, as the total water content is reduced, the heat energy supplied to the water is also reduced; at the same time the area of surface contact at the drying interface is increased. The cumulative effect is rapid, uniform drying rates at temperatures below glazing temperatures to moisture contents of 4% and below. Thereafter, the flavor and quality of the substantially dry product are maintained by further drying to equilibrium at atmospheric pressure and temperature under the driving force provided by unusually low absolute humidities in a contacting atmosphere. In this way, fast, effective, low temperature drying may be accomplished to moisture contents as low as 1%, or lower, enabling delicate flavor and product quality to be preserved throughout the drying process.

Referring to the drawings, Fig. 1 exemplifies a continuous process according to the invention. The liquefied charge 30, including fruit, vegetable or other source materials, which may previously have been concentrated to about 60% solids, is fed onto an endless conveyor belt 12 moving continuously within an airtight chamber or room 10. In the illustrated apparatus, the charge is fed to the belt through a perforated pipe 14, although other means such as a rotary valve or dip tank might advantageously be employed. Preferably, the chamber 10 is subdivided into a series of compartments 16, 17 and 18 particularly adapted to the progressive control of vacuum and material temperature within the compartments and to the rapid vaporization of moisture from the source materials as they move continuously through the chamber. As shown, the compartments may be provided by baffles 19 extending the vertical height of the chamber, but having openings 20, 21 for passage of the belt 12. Preferably the belt 12 is from 40 to 70 feet in effective length with the material moving on the belt acting to maintain conditions of vacuum in each of the compartments by providing a substantial seal of the openings 20, as will appear. The belt itself is unheated, and may be of stainless steel, plastic composition, nylon, or other suitable material which has the property of relatively low emissivity.

It is a particular feature of the invention that the liquid moving with the belt is subjected during its passage through the compartments to radiant energy particularly adapted to causing formation and liberation of water vapor from the material. For this purpose, series of radiant heating elements 22, 23 and 24 are provided in each of the compartments 16, 17 and 18 respectively. These elements may be of any type suitable for the purpose, such as heated metal filaments or "Nichrome" ribbons capable upon electrical excitation of emitting radiant energy within a desired range of wave lengths. Electrical energy is supplied to the elements by any suitable electrical source 25 through rheostats or transformers 26 controlling the power input to the elements.

According to the invention, the emissions of radiant energy are maintained within the range of infrared or hertzian radiations having wave lengths of from about 3.5 to 5.5 microns in length since it has been found that, within this range, a maximum excitation and consequently an usually efficient, low temperature vaporization of the water molecules in the liquefied source material 30 may be achieved. As is well known to workers in this art, radiations within the desired range of wave lengths may be achieved in a number of ways: by the use of electrical filters, by a proper selection of filaments, by varying current input, by proper choice of the atmosphere within which the radiations occur, or by any suitable combination of these techniques.

While the precise theory of such low temperature excitation is not clearly understood, it is believed that radiations within the range indicated approximate resonant frequencies of the water molecules. As a result, formation and liberation of water vapor within the liquefied concentrate, is greatly accelerated without, on the other hand, causing a substantial increase in the temperature of the fruit or vegetable source material. The radiant heating of the moving layer of material tends to cause vaporization of moisture within the layer without any tendency towards surface glazing. The net effect is an even, uniform drying of the material from the top to the bottom of the layer.

One of the important concepts of the invention is that vapor is continuously removed from the atmosphere ambient the moving layer of material under conditions of controlled vacuum and at a rate adapted to maintain conditions of saturation at the existing sub-atmospheric pressures, thereby achieving maximum efficiency of vaporization within the chamber 10. Control over the vacuum results from a unique system of ports 34 provided in the baffles 19 which in conjunction with the evacuating means 55 permit the pressure of the atmosphere within the chamber 10 to be progressively decreased in the path of the material 30 moving through the chamber. Preferably, the evacuating means exerts maximum suction on the outlet compartment 18 with the degree of vacuum being progressively diminished in the compartments 16 and 17 by the simple expedient of regulating the number of size of the ports between the compartments. Thus, if a vacuum of 4.5 mm. of Hg absolute is being maintained in the outlet compartment 18, a degree of vacuum ranging anywhere from 10 mm. up to several hundred mm. could easily be achieved by a proper dimensioning of the ports provided in the baffles separating compartments 17 and 18. In actual practice, the vacuum in outlet compartment 18 is preferably maintained between about 1 to 6 mm. of Hg; while the vacuum in compartments 17 and 16 is preferably regulated between about 12 to 60, and 80 to 120 mm. of Hg absolute, respectively.

The effect of increasing the vacuum exerted on the layer of material 30 moving through the chamber is to cause an initial puffing of the material in the compartment 16 with the puffing increasing progressively as the material moves through compartments 17 and 18. The puffing is produced initially by a rapid formation of water vapor within the material so that the layer "rises" in a manner similar to that observed in the baking of bread. As the vacuum is increased, the bubbles of water vapor enlarge causing further puffing. The degree of puffing depends primarily on the specific volume of the water vapor at the existing absolute pressures and may vary considerably from compartment to compartment. For example, water vapor has a specific volume of only 178 cubic feet per pound at 100 mm. whereas its specific volume increases to 3306 cubic feet per pound at 4.5 mm. The effect of this puffing is to progressively increase the surface of contact between the gaseous drying medium being evacuated from the chamber and the water remaining in the material. As a result, although the amount of water within the moving material is being steadily reduced by vaporization, the drying rate will remain substantially uniform throughout the drying operation due to a progressive increase in the area of drying contact and a consequent increase in the relative speed of vaporization.

Any suitable mechanism may be employed to exert the desired vacuum on chamber 10. In the illustrated apparatus, a multi-stage steam jet ejector system is utilized. As shown, high pressure steam is admitted through line 38 to a jet pump 40 that sends jets of very high velocity into the throat of a venturi tube 42. The non-condensable, vapor-containing gases being removed from chamber 10 enter the pump at 36. For the very high vacua required in compartment 18 (i. e., absolute pressures of 6 mm. of Hg or less), the steam air mixture from jet 42 preferably goes to an auxiliary condenser 44 where the steam is largely removed. The residual non-condensables are then passed to a second jet pump 46 through line 48 while the condensate is removed from the condenser through line 50. The discharge from the second jet 46 goes into another condenser 52 with the non-condensable gas passing through line 54 to a third jet 56; from the jet 56 the gas passes into a third condenser 58 where it finally exhausts to the atmosphere at 60. The condensate from condensers 52 and 58 is collected in lines 62 for discharge along with the initial condensate from tank 44 to a collecting tank 64.

As previously mentioned, vapor is removed from the chamber 10 as fast as it is able to saturate the atmosphere ambient the material so that vaporization proceeds rapidly at the existing subatmospheric pressures. It is a further feature of the invention, however, that relative humidities of the atmosphere are lowered by heat energy absorbed from the heated filaments 22, thereby increasing the driving force inducing vaporization. It will be readily understood that the air circulating adjacent the filaments, which may be in the neighborhood of 2200° F., will absorb considerable heat, and immediately adjacent a filament may undergo temperature increase to temperatures as high as 1000° F. to 1200° F. The effect is a tremendous instantaneous lowering of relative humidities of the atmosphere circulating downwardly adjacent the material, through the openings 20 and out through the steam ejector system 38. The resulting difference in vapor pressure produces a greatly accelerated removal of bound, hygroscopic or chemically combined moisture of the type not easily evaporated by direct application of heat. It will be observed therefore, that the radiant heat energy functions not only to dry the material directly by penetration but also indirectly by lowering the relative humidity of the circulating drying gases.

In its operation, the dehydrating chamber 10 acts to remove water from the liquefied concentrate 30 in the following manner:

The source material sprayed through pipe 14 is deposited on the moving belt 12 and moves with the belt as a layer towards the right hand side of the chamber 10. In compartment 16, the partial vacuum of from 80 to 120 mm. of Hg absolute coupled with the radiant energy absorbed from elements 22 immediately causes puffing of the layer 30 through increase of the specific volume of the water vapor liberated from the material. Because of the comparatively large amount of water present, the filament temperature of the radiant heating element 22 may be regulated by its rheostat 25 to between 1800 and 2400° F., providing a maximum energy of radiation to the layer within the desired range of infrared and hertzian wave length radiations. At this level of heat energy, the relative humidity of the low pressure air circulating below the element 22 is reduced substantially, with a corresponding increase in the rate of vaporization occuring within the compartment. In compartment 17, a lower absolute pressure between about 40 to 60 mm. of Hg absolute is coupled with a somewhat lower energy level of radiation to continue the drying process without causing the appreciable increase of the temperature of the source material 30. This is accomplished by reduction in the filament temperature of the radiant element 23 to between 1200° F. and 1800° F. The drying rate remains substantially uniform, however, due to the corresponding decrease in the absolute pressures. In compartment 18, the uniform, effective drying is continued by lowering absolute pressures to below 6 mm. of Hg absolute and the filament temperatures of the infrared element 24 to between about 400 and 500° F. The resulting tremendous increase in the specific volume of the liberated vapor causes an even greater puffing of the layer, providing a corresponding increase in the area of surface contact between the air and the little water vapor remaining within the material on the belt. At the existing low absolute pressures, relative humidities are again substantially lowered by the effect of temperature increase adjacent the filament 24 so that the drying potential remains high. At the end of the belt, the substantially dry material having a moisture content of from 3 to 4 percent (wet basis) is removed from the chamber 10 for further drying. Preferably the heated material is macerated prior to its removal from the chamber, as by rotary and stationary cutter blades 70 and 72. The finely divided material may then fall into a suitable discharge mechanism, such as the rotary star valve 74, leading from the chamber 10 into a package room 80.

After substantial drying in the chamber 10, the material is further dried to a free-flowing, dry, readily wettable product suitable for marketing. In carrying out this phase of the invention, resort is made to a difference in vapor pressure between the moisture remaining in the pores of the material 30 and an atmosphere of very low absolute humidity provided in a drying or packaging room 80 through which the material is passed. It will be understood that as long as the vapor pressure of the moisture remaining within the material is greater than the vapor pressure of the surrounding atmosphere, moisture will travel outward to the surface of each particle of material, and be evaporated. According to the present invention, the already substantially dry material 30 is subjected to an atmosphere in the room 80 having a relative humidity of about 2% to 5% for a time sufficient to reduce the moisture content of the material below 2% (wet basis). Preferably, the room 80 is maintained at atmospheric pressure and at a temperature adapted also to the cooling of the material as it leaves the chamber 10. Drying is allowed to continue until equilibrium conditions are achieved, thereby permitting uniform control over the dryness of the material at the conditions predetermined to exist in the room 80.

Drying of the atmosphere within the room 80 (to achieve the low absolute humidities desired) may be achieved in a number of ways: by the use of desiccants such as activated alumina or silica gel, by the use of solid absorbents such as calcium chloride, by direct-contact absorption with lithium chloride or bromide, ethylene glycol and the like, or by refrigeration. Primarily because it is possible to operate with total recirculation, direct contact with strong aqueous solutions of lithium chloride is preferred. A typical system for this purpose is shown diagrammatically in Fig. 1 and may include a liquid contactor 86, a solution concentrator 87, a solution heater 88, a cooling coil 89 and eliminators 91. The air to be conditioned is brought into contact with a spray of the aqueous brine solution which has a vapor pressure below that of the entering air, resulting in a transfer of moisture from the air to the brine solution. The temperature change of the air being processed may be determined by the cooling water temperature, the amount of moisture removed by the equipment and, if desired, by precooling the absorbent solution with a suitable surface cooler (not shown). The excess water of condensation, which dilutes the brine, is removed in the solution concentrator 87. The concentrated brine is then returned to the contact spray. By proper control of moisture removal and drying air temperatures, it will be evident that the degree of relative humidity within the drying room can be accurately controlled within the desired range.

Any suitable means may be provided for conveying the material through the room 80 such as endless belts 82 and 84 extending lengthwise of the room. To a worker in the art, it will be apparent that as equilibrium conditions are approached within room 80, a dry powdery, readily wettable food product will be produced on the belt in a form suitable for packaging. Packaging may be accomplished within the room by means of the canning line 100 illustrated diagrammatically in Fig. 1 or by any other suitable means. From the canning line, the product may be removed for market in a dry, readily wettable, state particularly suited to reconstitution at a later date into liquid form having essentially the characteristics of the original source material.

The applicability of the above process of drying liquefied fruit and vegetable source materials according to the invention is illustrated by the following specific examples:

Example 1

Employing the apparatus of Fig. 1, liquefied grape concentrate having a specific gravity of 50° on the Brix scale is fed to the belt 12 at a rate of 600 pounds per hour. The multi-state stage steam ejector is operated to produce a vacuum in chamber 18 of 1 mm. of Hg absolute and the ports 34 dimensioned to provide absolute pressures in chambers 16 and 17 of 10 and 60 mm. of Hg absolute, respectively. The rheostats 26 are regulated to produce filament temperatures of 2200° F. in compartment 16, 1500° F. in compartment 17 and 600° F. in compartment 18. The speed of the belt 12 is regulated to produce a traverse rate of material through the chamber 10 of 20 minutes. Determinations of moisture content (wet basis) of substantially dry product delivered to the star valve 74 indicate a moisture content of about 3%, and a rate of feed to belt 82 of approximately 300 pounds per hour of the dry product. In the drying room 80, air is fed to the drying unit at a rate of 30 cubic feet per minute, with a relative humidity of 3% being achieved within the drying room at an approximate temperature of 90° F. The traversed rate of material on belts 82 and 84 is regulated at 60 minutes so that the total drying time in room 80 is 120 minutes. The moisture content determined on the product prior to canning is 1% (wet basis). The specific gravity of the final product is 99° Brix.

Example 2

The procedure of Example 1 is repeated except that the feed is orange concentrate having a specific gravity on the Brix scale of 65°. Filament temperatures of the radiant heat elements in compartments 16, 17 and 18 are varied to produce temperatures of 2000° F., 1400° F., and 500° F. Absolute pressure in compartment 17 is varied somewhat to produce a pressure of 15 mm. of Hg absolute. Traverse rates through the drying chamber 10 and drying room 80 are maintained as before. Determinations of moisture content of the substantial dry material falling into the drying room again indicate a moisture content of 3%; likewise the moisture content of the finished product leaving the canning line is again determined to be 1% and its specific gravity 99° Brix.

While the process heretofore described as related to a continuous process such as would be particularly useful in industrial applications, it will be understood that an intermittent or batch process might also be employed. In Fig. 2, two drying chambers 90 and 92 are illustrated with the separate chambers adapted to be used alternately on a batch basis. In this modified procedure, the liquefied concentrate is fed to trays 94 arranged in a row or in tiers within one of the drying chambers. As in the continuous process, the trays are subjected to radiations of the desired wave length by radiation element 96. On closing the door 98 to the drying chamber, the chamber may be evacuated in a manner similar to that described in Fig. 1 through a multi-stage ejector system 100. However, control of the degree of vacuum exerted within the chamber is accomplished by means of the evacuating system instead of baffles arranged within the chamber. Thus, in the initial stages, of the vaporization process, only valve 102 need be opened, admitting steam to the first jet pump 104. At predetermined points in the operation, valves 106 and 108 could be opened in sequence to exert an additional vacuum through jet pumps 110 and 112, respectively, achieving the desired control over conditions of vacuum within the chamber. Condensation again occurs through any suitable condensing system, such as water cooled condensers 114 and 116, the condensate being collected in a collecting tank 118. It should be noted that certain flavor-imparting oils or other food chemicals may be removed with the condensate and that such oils and material might be recovered from the collecting tank 118 for return to the product or for independent use.

At the end of the dehydration cycle, air is admitted through valve 120 to the drying chamber allowing door 98 to be opened. While the material on the trays is being removed, the source material may be diverted to the alternate drying tank 92 where the operations are repeated. In this way, substantially dried material is fed in alternating sequence to a storage area 122 and from thence through a pulverizer 124 to a canning line 126 or other packaging operation. In other respects, the alternate batch operation described is similar to the continuous operation of Fig. 1.

It will be observed that the operation of drying liquids according to the invention is rapid, efficient, and proceeds at material temperatures incapable of producing cooked or off-flavors. Moreover, a packaged product may be produced in an unusually dry, crystalline form uniquely suited to reconstitution into a liquefied form having the characteristics of the original source materials. As a result, the process of the invention makes possible dried, easily transported food and beverage products hitherto impractical by prior art methods.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A process of producing a free-flowing, granular, substantially dry, readily wettable product from liquefied fruit and vegetable source material having a moisture content in excess of 4% and containing fruit sugars and glucosides without development of off flavors, which comprises: subjecting a layer of liquefied fruit and vegetable source material containing water to infrared and hertzian radiation of from about 3.5 to 5.5 micron wave length while said material is upon an unheated support of low emissivity; progressively and controllably decreasing the pressure of atmosphere ambient said material from about 120 mm. of Hg absolute to below about 6 mm. of Hg absolute to cause formation and liberation of water vapor from said material; progressively and controllably decreasing the energy of radiation to which said layer of material is subjected; removing vapor from said ambient atmosphere at a rate adapted to maintain a virtually saturated condition therein at the existing subatmospheric pressures without entrainment of dehydrated material in the vapors removed for a time sufficient to reduce the moisture content of the material to below 4% but insufficient to heat the material to above 100° F. and cause appreciable glazing of the material; cooling and granulating the substantially dry material; and packaging the material thus treated.

2. A process of producing a free-flowing granular, substantially dry, readily wettable product from liquefied fruit and vegetable source material having a moisture content in excess of 4% and containing fruit sugars and glucosides without development of off flavors, which comprises: subjecting a layer of liquefied fruit and vegetable source material containing water to infrared and hertzian radiation of from about 3.5 micron to 5.5 micron wave length while said material is upon an unheated support of low emissivity; progressively and controllably decreasing the pressure of atmosphere ambient said material from about 120 mm. of Hg absolute to below about 6 mm. of Hg absolute to cause formation and liberation of water vapor from said material; progressively and controllably decreasing the energy of radiation to which said layer of material is subjected; removing vapor from said ambient atmosphere at a rate adapted to maintain a virtually saturated condition therein at the existing subatmospheric pressures without entrainment of dehydrated material in the vapors removed for a time sufficient to reduce the moisture content of the material to below 4%, but insufficient to heat the material to above 100° F. and cause appreciable glazing of the material; cooling and granulating the substantially dry material; exposing the substantially dry material to an atmosphere having a relative humidity of about 2% to about 5% and at atmospheric pressure for a time sufficient to reduce the moisture content of the substantially dry material to below 2%; and packaging the material thus treated.

3. A process of producing a free-flowing granular, substantially dry, readily wettable product from liquefied fruit and vegetable source material having a moisture content in excess of 4% and containing heat sensitive fruit sugars and glucosides, which comprises: progressively and continuously moving a layer of said liquefied source material containing water through a dehydrating zone, subjecting said layer to radiation of a wave length between about 3.5 to 5.5 microns particularly adapted to causing formation and liberation of water vapor from said material; progressively and controllably decreasing the pressure of atmosphere in said zone from about 120 mm. of Hg absolute to about 6 mm. of Hg absolute to cause puffing of said layer of material by increasing the rate of formation and liberation of said water vapor; removing vapor from the atmosphere in said zone at a rate adapted to maintain a virtually saturated condition therein at the existing subatmospheric pressures and without entrainment of dehydrated material in the vapors removed; progressively and controllably decreasing the energy of radiation to which said layer of material is subjected to prevent heating above about 100° F. and consequent appreciable glazing of the material; and cooling and granulating the substantially dry material; whereby the moisture content of the material may be reduced to below 4% without development of off flavors.

4. The process of claim 3 involving the use of heated bodies spaced within said zone and radiating heat energy to said moving layer of material, the temperatures of said bodies being modulated from about 2200° F. at the point of entry of said layer into the zone to about 400° F. at the exit point of said layer from the zone.

5. The process of claim 3 involving the use of separate chambers within said dehydrating zone and along a path of movement of said layer of material, the pressures within said separate chambers varying from about 120 mm. of Hg absolute at the point of entry of said layer into the zone to about 1 mm. of Hg absolute at the exit point of said layer from the zone.

6. A process of reducing to substantial dryness without development of off flavors, liquefied fruit and vegetable source material having a moisture content in excess of 4% and containing fruit sugars and glucosides, which comprises: progressively and continuously moving a layer of said liquefied source material through a primary dehydrating zone while said material is on an unheated support of low emissivity; subjecting said layer of material to radiation of a wave length between about 3.5 and 5.5 microns particularly adapted to causing formation and liberation of water vapor from said layer of material; progressively and controllably decreasing the pressure of atmosphere in said primary zone from about 120 mm. of Hg absolute to below 6 mm. of Hg absolute to cause puffing of said layer through increase in the specific volume of water vapor liberated from said material; removing vapor from the atmosphere in said primary zone at a rate adapted to maintain a virtually saturated condition therein at the existing subatmospheric pressures and to reduce the moisture content of the material to below 4% without entrainment of dehydrated material when the vapor is removed; progressively and controllably decreasing the energy of radiation to which said layer of material is subjected to prevent said puffed layer from being heated to temperatures capable of causing appreciable glazing of the material; cooling and granulating the substantially dry material; progressively and continuously moving the substantially dry material from said primary zone into a secondary zone maintained at atmospheric pressure and having a relative humidity of about 2% to 5%; retaining said granulated material in said secondary zone for a time sufficient to reduce the moisture content of the substantially dry material to below 2%, and packaging the material thus treated.

7. In an apparatus for producing dried, readily wettable food products, the combination of: walls forming an airtight chamber; means for conveying liquefied material to be dried through said chamber; means feeding said liquefied material to said conveying means; means for evacuating gases from said chamber and thereby to supplement heat energy in causing formation and liberation of water vapor from said material; means radiating heat energy to said liquefied material as it passes through said chamber, said radiating means including means to provide a progressive controlled decrease in the energy of heat radiated to said material; baffles dividing said chamber into transverse compartments, said conveying means moving through said baffles and compartments, said baffles having openings for said conveying means and ports of preselected cross sectional area allowing passing of said evacuated gases and water vapor, said baffles and ports cooperating with said means for evacuating gases to provide a progressive controlled decrease in the pressure of atmosphere ambient said material; and means for removing substantially dried material from said conveying means and said chamber without effecting conditions of atmosphere existing in said chamber whereby conditions of atmosphere in said compartments and the energy of heat radiated to said material may be progressively controlled along the length of material movement through said chamber.

8. The apparatus of claim 7 in which said means radiating heat energy are filaments capable on electrical excitation of emitting infrared end hertzian radiations of from about 3.5 to 5.5 microns in wave length.

9. The apparatus of claim 7 in which means are also provided for mascerating and granulating said substantially dry material prior to its removal from said chamber.

10. In an apparatus for producing dried, readily wettable food products, the combination of: walls forming an airtight chamber; means for conveying liquefied material to be dried and having a moisture content in excess of 4% through said chamber; means feeding said liquefied material to said conveying means; means for evacuating gases from said chamber and thereby to supplement heat energy in causing formation and liberation of water vapor from said material; controlled means for radiating heat energy to said liquefied material as it passes through said chamber; baffles dividing said chamber into transverse compartments, said conveying means moving through said baffles and compartments, said baffles having openings for said conveying means and ports of preselected cross sectional area allowing passage of said evacuated gases and water vapor, said baffles and ports cooperating with said means for evacuating gases to provide a measure of control over the pressure of atmosphere in each of said transverse compartments; a drying room; means for removing substantially dried material from said chamber into said drying room without effecting subatmospheric pressures existing in said chamber, said drying room having inlet and outlet openings for the passage of drying gases at substantially atmospheric pressures; means for lowering the absolute humidity of said entering drying gases and also for providing temperature control, said last-named means permitting relative humidities in said drying room to be lowered substantially to below about 5%; and means for conveying said substantially dried material through said drying room whereby liquefied food concentrates may be rapidly and efficiently dried to a dried product having a moisture content of 2% and below wet basis, without development of off flavors.

11. The apparatus of claim 10 in which means are provided for packaging said dried products within said drying room, whereby the hygroscopic moisture content of the packaged product is maintained at a minimum.

References Cited in the file of this patent

UNITED STATES PATENTS

| | | |
|---|---|---|
| 888,257 | Passburg | May 19, 1908 |
| 1,039,987 | Mewborne | Oct. 1, 1912 |
| 2,192,041 | Headland | Feb. 27, 1940 |
| 2,349,300 | Olsen | May 23, 1944 |
| 2,386,052 | Lundy | Oct. 2, 1945 |
| 2,541,859 | Callaghan et al. | Feb. 13, 1951 |
| 2,722,749 | Dargert | Nov. 8, 1955 |
| 2,806,796 | Dorsey | Sept. 17, 1957 |